United States Patent
DeMoss et al.

(10) Patent No.: US 10,610,029 B2
(45) Date of Patent: Apr. 7, 2020

(54) COIL-IN-COIL SPRINGS WITH NON-LINEAR LOADING RESPONSES AND MATTRESSES INCLUDING THE SAME

(71) Applicant: Sealy Technology, LLC, Trinity, NC (US)

(72) Inventors: Larry K. DeMoss, Greensboro, NC (US); Brian M. Manuszak, Thomasville, NC (US); Darin T. Thomas, Salisbury, NC (US)

(73) Assignee: Sealy Technology, LLC, Trinity, NC (US)

( * ) Notice: Subject to any disclaimer, the term of this patent is extended or adjusted under 35 U.S.C. 154(b) by 0 days.

(21) Appl. No.: 15/322,886

(22) PCT Filed: Jan. 21, 2016

(86) PCT No.: PCT/US2016/014299
§ 371 (c)(1),
(2) Date: Dec. 29, 2016

(87) PCT Pub. No.: WO2017/127082
PCT Pub. Date: Jul. 27, 2017

(65) Prior Publication Data
US 2018/0027983 A1 Feb. 1, 2018

(51) Int. Cl.
*A47C 27/06* (2006.01)
*F16F 3/04* (2006.01)

(52) U.S. Cl.
CPC .......... *A47C 27/065* (2013.01); *A47C 27/064* (2013.01); *F16F 3/04* (2013.01)

(58) Field of Classification Search
CPC ... A47C 27/064; A47C 27/065; A47C 27/062; A47C 23/0438; A47C 27/04; A47C 23/04; F16F 3/04; F16F 1/04
(Continued)

(56) References Cited

U.S. PATENT DOCUMENTS 2,480,158 A * 8/1949 Owen ................ A47C 27/0453
267/91
4,077,619 A * 3/1978 Borlinghaus ............. F16F 1/08
267/166.1
(Continued)

FOREIGN PATENT DOCUMENTS

| FR | 2780624 A1 | 1/2000 |
|---|---|---|
| JP | 60081528 A * | 5/1985 |
| JP | 2010-527795 A | 8/2010 |

OTHER PUBLICATIONS

International Searching Authority, International Search Report; Written Opinion, dated Oct. 5, 2016; 16 pages.
(Continued)

*Primary Examiner* — Bradley T King
*Assistant Examiner* — Mahbubur Rashid
(74) *Attorney, Agent, or Firm* — Middleton Reutlinger

(57) ABSTRACT

A coil-in-coil spring is provided that exhibits a variable and non-linear loading response. The spring includes a first spring portion having a first spring constant, a second spring portion having a second spring constant less than the first spring constant, and a third spring portion having a third spring constant less than the first spring constant and less than the second spring constant. The first spring portion forms an outer coil of the coil-in-coil spring and the second spring portion, the third spring portion, or both the second spring portion and the third spring portion are positioned within the first spring portion and form an inner coil of the coil-in-coil spring. A multi-coil spring is also provided that includes an outer coil, an intermediate coil positioned within the outer coil, and an inner coil positioned with the intermediate coil.

14 Claims, 6 Drawing Sheets

(58) Field of Classification Search
USPC .......................................................... 267/168
See application file for complete search history.

(56) References Cited

U.S. PATENT DOCUMENTS

| | | | | | |
|---|---|---|---|---|---|
| 5,868,383 | A | * | 2/1999 | Codos | B68G 9/00 267/166.1 |
| 5,878,998 | A | * | 3/1999 | Hsieh | F16F 1/046 267/166.1 |
| 6,128,798 | A | * | 10/2000 | Barman | A47C 27/05 5/654.1 |
| 6,256,820 | B1 | * | 7/2001 | Moser | A47C 27/062 267/166 |
| 6,318,416 | B1 | * | 11/2001 | Grueninger | A47C 27/062 140/3 CA |
| 6,668,406 | B2 | * | 12/2003 | Spinks | A47C 23/0433 5/256 |
| 7,908,693 | B2 | * | 3/2011 | DeMoss | A47C 27/064 5/246 |
| 8,905,386 | B2 | * | 12/2014 | Rasbach | B60G 9/00 267/168 |
| 8,979,079 | B2 | * | 3/2015 | DeFranks | F16F 1/04 267/166.1 |
| 2002/0152554 | A1 | | 10/2002 | Spinks et al. | |
| 2005/0005354 | A1 | | 1/2005 | Gladney et al. | |
| 2007/0017035 | A1 | * | 1/2007 | Chen | A47C 23/0433 5/720 |
| 2010/0257675 | A1 | | 10/2010 | DeMoss | |
| 2011/0148018 | A1 | * | 6/2011 | DeFranks | A47C 23/0438 267/166.1 |
| 2011/0227353 | A1 | * | 9/2011 | Nagwanshi | B60R 19/18 293/137 |
| 2012/0042454 | A1 | * | 2/2012 | Viberg | A47C 23/0435 5/727 |
| 2013/0081207 | A1 | * | 4/2013 | Cohen | A47C 27/056 5/718 |
| 2014/0250602 | A1 | * | 9/2014 | Spinks | F16F 3/04 5/716 |
| 2015/0068568 | A1 | * | 3/2015 | Wu | F03G 1/02 135/22 |

OTHER PUBLICATIONS

European Patent Office, Communication for Application No. 16886720.8 dated Apr. 1, 2019.

* cited by examiner

COIL-IN-COIL SPRINGS WITH NON-LINEAR LOADING RESPONSES AND MATTRESSES INCLUDING THE SAME

TECHNICAL FIELD

The present invention relates to coil-in-coil springs and mattresses including coil-in-coil springs. In particular, the present invention relates to coil-in-coil springs that are comprised of a continuous wire and that exhibit a variable and non-linear loading response when compressed.

BACKGROUND

Typically, when a uniaxial load is applied to a spring, the spring exhibits a linear compression rate. That is to say, it takes twice as much force to compress a typical spring two inches as it does to compress the same spring one inch. The linear response of springs is expressed by Hooke's law, which states that the force (F) needed to extend or compress a spring by some distance (D) is proportional to that distance. This relationship is expressed mathematically as F=kD, where k represents the spring constant for a particular spring. A high spring constant indicates that the spring requires more force to compress, and a low spring constant means the spring requires less force to compress.

Linear response springs, such as wire coil springs, are commonly used as mattress innersprings in combination with padding and upholstery that surround the innersprings. Most mattress innersprings are comprised of an array of wire coil springs which are often adjoined by lacing end convolutions of the coil springs together with cross wires. An advantage of this arrangement is that it is inexpensive to manufacture. However, this type of innerspring often provides a firm and rigid mattress surface.

An alternative to an innerspring mattress is a mattress constructed of one or more foam layers. Unlike an innerspring mattress comprised of an array of wire coil springs, these foam layers exhibit a non-linear response to forces applied to the mattress. In particular, a foam mattress provides more support as the load increases. For instance, a typical foam mattress provides increased support after it has been compressed approximately 60% of the maximum compression of the foam. That non-linear response of foam mattresses is typically regarded as providing improved sleep comfort for a user. However, the mechanical properties of certain foam may degrade over time, which, in turn, affects the overall comfort of the foam mattress. Furthermore, foam mattresses are often more costly to produce than metal spring mattresses.

SUMMARY

The present invention includes coil-in-coil springs and mattresses including coil-in-coil springs. In particular, the present invention includes coil-in-coil springs that are comprised of a continuous wire and that exhibit a variable and non-linear loading response when compressed. Thus, the coil-in-coil springs of the present invention provide a user with the non-linear support typically seen in a foam mattress, but through the use of coil-in-coil springs.

In one exemplary embodiment of the present invention, a coil-in-coil spring is provided that is comprised of a continuous wire forming an outer coil and an inner coil, which is positioned within the outer coil. The continuous wire further forms a first spring portion having a first spring constant, a second spring portion having a second spring constant less than the first spring constant, and a third spring portion having a third spring constant less than the first spring constant and less than the second spring constant. Specifically, in some embodiments of the present invention, the third spring portion is positioned above the first spring portion such that the first spring portion and the third spring portion collectively form the outer coil of the coil-in-coil spring, and the second spring portion is positioned within the first spring portion such that the second spring portion forms the inner coil of the coil-in-coil spring. In other embodiments of the present invention, the second spring portion and the third spring portion are both positioned within the first spring portion such that the second spring portion and the third spring portion collectively form the inner coil of the coil-in-coil spring and the first spring portion forms the outer coil of the coil-in-coil spring. In either event, the coil-in-coil spring is configured such that the outer coil has an uncompressed height which is greater than the uncompressed height of the inner coil.

By forming the continuous wire of an exemplary coil-in-coil spring of the present invention in a manner where the individual spring constants of the first spring portion, the second spring portion, and the third spring portion are variably combined as the coil-in-coil spring compresses, a first overall spring constant of the coil-in-coil spring provides a soft feel as the spring is initially compressed, a second overall spring constant of the coil-in-coil spring provides an intermediate feel as compression of the coil-in-coil spring increases, and a third overall spring constant of the coil-in-coil spring provides a firmer feel as compression of the coil-in-coil spring increases further.

In operation, the outer coil and the inner coil of the exemplary coil-in-coil springs function substantially as two helical springs in parallel. However, because the uncompressed height of the outer coil is greater than the uncompressed height of the inner coil, when a force is first applied to the coil-in-coil spring, only the outer coil begins to compress. Once the coil-in-coil spring is compressed to the point where the compressed height of the outer coil is equal to the uncompressed height of the inner coil, the inner coil is then engaged and the coil-in-coil spring compresses according to the combined spring constant of the outer coil and the inner coil. Furthermore, because the third spring constant of the third spring portion is less than the first spring constant of the first spring portion and also less than the second spring constant of the second spring portion, at some predetermined compression distance the third spring portion becomes fully compressed and deactivated while the first spring portion and the second spring portion continue to compress. In other words, each exemplary coil-in-coil spring initially compresses according to a first overall spring constant that is based on the spring constant of the outer coil. After further compression, the inner coil is engaged such that all spring portions are simultaneously engaged and contribute to a second overall spring constant of the coil-in-coil spring. Further compression then eventually results in the third spring portion becoming deactivated such that a third overall spring constant of the coil-in-coil spring is based on the first spring constant of the first spring portion and the second spring constant of the second spring portion.

As a further refinement to the present invention, additional intermediate coils can also be positioned between the inner coil and the outer coil. For instance, in another exemplary embodiment of the present invention, a multi-coil spring is provided that is comprised of a continuous wire forming an outer coil having an uncompressed height, an intermediate coil positioned within the outer coil and having an uncompressed height less than the uncompressed height of the outer coil, and an inner coil positioned within the intermediate coil and having an uncompressed height less than the uncompressed height of the intermediate coil. As such, in operation, the outer coil, the intermediate coil, and the inner coil function substantially as three helical springs in parallel. When a force is first applied to the multi-coil spring, only the outer coil is engaged and compresses so that a first overall spring constant of the multi-coil spring is based only on the spring constant of the outer coil. Upon further compression, the intermediate coil is then engaged and begins to compress along with the outer coil so that a second overall spring constant of the multi-coil spring is based on the spring constant of the outer coil and the spring constant of the intermediate coil. Upon further compression, the inner coil is subsequently engaged and begins to compress along with the outer coil and the intermediate coil so that a third overall spring constant of the multi-coil spring is based on the spring constant of the outer coil, the spring constant of the intermediate coil, and the spring constant of the inner coil.

Regardless of the particular configuration of the exemplary coil-in-coil springs of the present invention, in some embodiments, each of the coil-in-coil springs, can further be included in a mattress to provide a user with the non-linear support typically seen in a foam mattress, but through the use of coil springs. For example, in some embodiments of the present invention, a mattress is provided that includes a plurality of the coil-in-coil springs described herein above arranged in a matrix. Such a mattress can also comprise an upper body supporting layer, a lower foundation layer, and a sidewall extending between the upper body supporting layer and the lower foundation layer and extending around the entire periphery of the two layers, such that the matrix of coil-in-coil springs is completely surrounded.

Further features and advantages of the present invention will become evident to those of ordinary skill in the art after a study of the description, figures, and non-limiting examples in this document.

DESCRIPTION OF EXEMPLARY EMBODIMENTS

The present invention includes coil-in-coil springs and mattresses including coil-in-coil springs. In particular, the present invention includes coil-in-coil springs that are comprised of a continuous wire and that exhibit a variable and non-linear loading response when compressed. Thus, the coil-in-coil springs of the present invention provide a user with the non-linear support typically seen in a foam mattress, but through the use of coil-in-coil springs.

Figure 1:
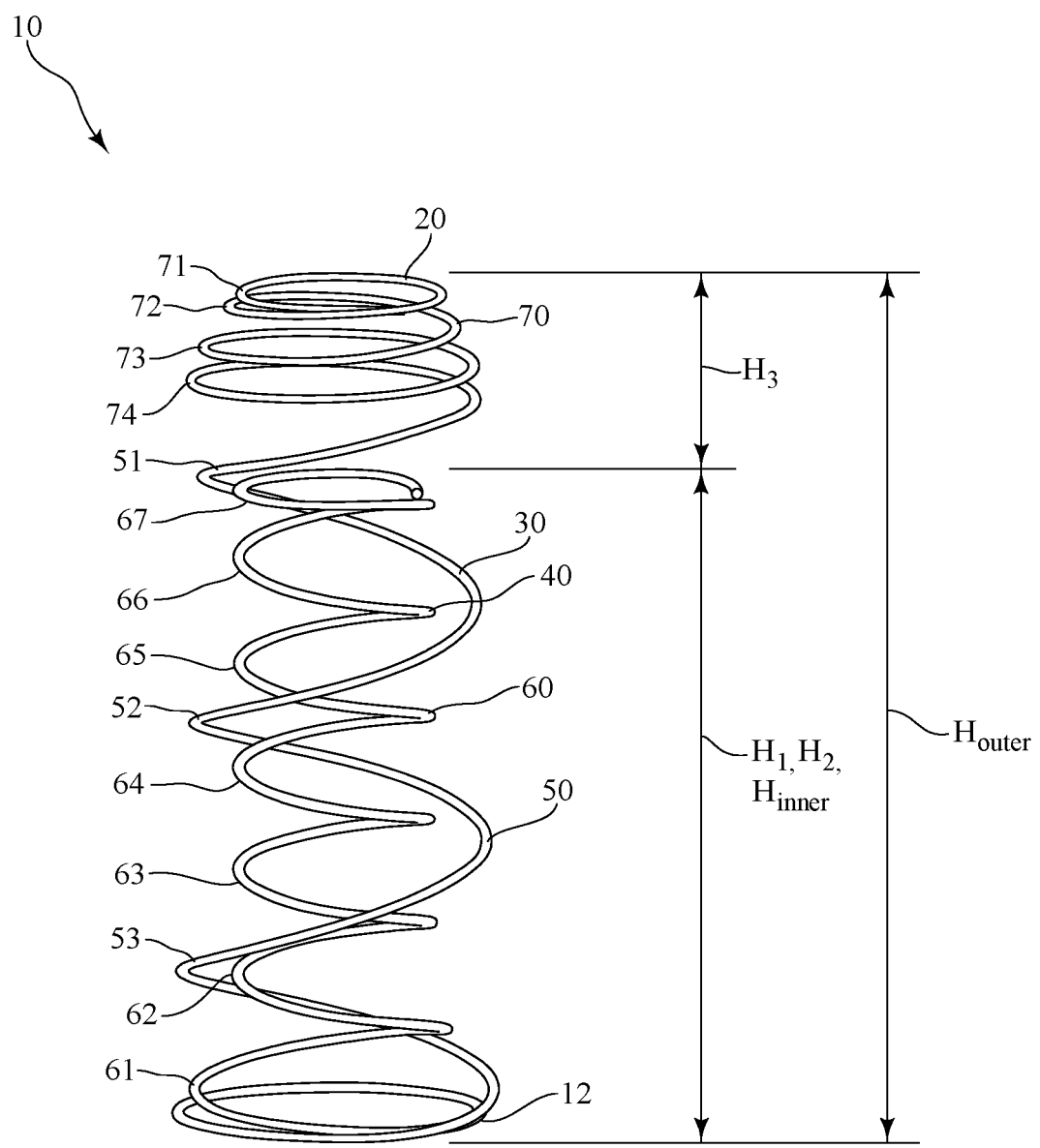
FIG. 1 is a side view of an exemplary coil-in-coil spring made in accordance with the present invention.

Referring first to FIG. 1, in one exemplary embodiment of the present invention, a coil-in-coil spring 10 is provided that is comprised of a continuous wire 20 forming an outer coil and an inner coil 40 positioned within the outer coil 30. Moreover, the continuous wire 20 forms a first spring portion 50, a second spring portion 60, and a third spring portion 70, which collectively form the outer coil 30 and the inner coil 40. Specifically, in the coil-in-coil spring 10 shown in FIG. 1, the third spring portion 70 is positioned above the first spring portion 50, such that the first spring portion 50 and the third spring portion 70 collectively form the outer coil 30 of the coil-in-coil spring 10. The second spring portion 60 is then positioned within the first spring portion 50, such that the second spring portion 60 forms the inner coil 40 of the coil-in-coil spring 10.

In the coil-in-coil spring 10, the first spring portion 50 has an uncompressed height $H_1$, the second spring portion 60 has an uncompressed height $H_2$, and the third spring portion has an uncompressed height $H_3$. As shown in FIG. 1, the uncompressed height $H_2$ of the second spring portion 60 is substantially equal to the uncompressed height $H_1$ of the first spring portion 50. As such, and further because the third spring portion 70 is positioned above the first spring portion 50, the outer coil 30 has an uncompressed height $H_{outer}$, which is equal to the uncompressed height $H_1$ of the first spring portion 50 plus the uncompressed height $H_3$ of the third spring portion 70, and which is greater than the uncompressed height $H_{inner}$ of the inner coil 40 (i.e., the uncompressed height $H_2$ of the second spring portion 60). More specifically, in the coil-in-coil spring 10, the uncompressed height $H_1$ of the first spring portion 50 is about 175 mm, the uncompressed height $H_2$ of the second spring portion 60 is about 175 mm, and the uncompressed height $H_3$ of the third spring portion 70 is about 42 mm to provide a total height of about 225 mm for the coil-in-coil spring 10. Furthermore, in the coil-in-coil spring 10, the first spring portion 50 has a diameter of about 82 mm, while the second spring portion 60 has a diameter of about 55 mm. Of course, while the foregoing dimensions are utilized in the exemplary coil-in-coil spring shown in FIG. 1, numerous other exemplary coil-in-coil springs having similar arrangements of spring portions, but including alternative dimensions can also be produced without departing from the spirit and scope of the present invention.

The first spring portion 50, the second spring portion 60, and the third spring portion 70 are each formed of a plurality of convolutions of the continuous wire 20 with each convolution made up of a portion of the continuous wire 20 substantially equal to about one turn of the continuous wire 20 (i.e., about 360° of the helical path of the continuous wire 20). Of note, the third spring portion 70 includes an upper end convolution 71, which forms a substantially planar loop at the topmost portion of the coil-in-coil spring 10. Similarly, a lower end 12 of the coil-in-coil spring 10 is also formed of a substantially planar loop at the lowermost portion of the coil-in-coil spring 10. In this way, the coil-in-coil spring 10 terminates at either end in a generally planar form which serve as the supporting end structures of the coil-in-coil spring 10.

With regard to the remaining convolutions of the coil-in-coil spring 10, in most coil springs formed with a helically-spiraling continuous wire, the spring constant and resultant feel of the coil spring are primarily determined by the wire gauge, the total number of convolutions in the coil spring, the size of the convolutions (coil diameter), and the pitch between the convolutions of the coil spring. In this regard, the pitch (or vertical spacing) between each convolution of a coil spring is typically controlled by the rate at which the continuous wire, which forms the coil spring, is drawn through a forming die in a coil-forming machine. Once formed, a larger pitch will typically produce a stiffer coil spring due to the increased vertical orientation of the wire, while a smaller pitch will typically produce a softer coil spring and allow for a larger number of total convolutions in the coil body. Similarly, larger diameter convolutions in a coil spring also contribute to a lower spring constant and consequentially softer coil spring. Of course, because the wire forming the coil-in-coil spring is continuous there is no clearly defined beginning point or ending point of any single convolution. Furthermore, the diameter and pitch is typically adjusted gradually between one portion of the spring to another. As such, oftentimes a single convolution of the coil spring does not, in fact, have just one single diameter or just one single pitch, but may include, for example, a beginning or end portion with a variable diameter and/or pitch that transitions to the adjacent convolution. Therefore, as used herein, the diameter and pitch of a convolution will typically refer to an average diameter and pitch, but can also, in some embodiments, be inclusive of or refer to a maximum diameter and pitch or a minimum diameter and pitch.

In the exemplary coil-in-coil springs described herein (e.g., the coil-in-coil spring 10 shown in FIG. 1), the wire diameter of the continuous wire forming an exemplary spring is generally constant along the entire length of the continuous wire, but in different embodiments can vary from about 0.072 inches to about 0.080 inches, with a preferred range from about 0.072 inches to about 0.076 inches. Furthermore, the continuous wire forming an exemplary spring typically has a tensile strength of between about 240 kpsi to about 260 kpsi, with a preferred tensile strength of about 250 kpsi. By including multiple spring portions with varying convolution diameters, pitches, or both convolution diameters and pitches in an exemplary coil-in-coil spring, however, a variable and non-linear loading response is provided where a first overall spring constant of the coil-in-coil spring provides a soft feel as the spring is initially compressed, a second overall spring constant of the coil-in-coil spring provides an intermediate feel as the compression of the coil-in-coil spring increases, and a third overall spring constant of the coil-in-coil spring provides a firmer feel as the compression of the coil-in-coil spring increases further. In other words, by forming the continuous wire of an exemplary coil-in-coil spring of the present invention in a manner where the individual spring constants of the first spring portion, the second spring portion, and the third spring portion are variably combined as the coil-in-coil spring compresses, an exemplary coil-in-coil spring can be configured to provide support similar to that observed in a foam mattress (i.e., where increased support is observed as the foam is compressed greater distances).

Referring still to FIG. 1, and with respect to the first spring portion 50, the second spring portion 60, and the third spring portion 70 of the exemplary coil-in-coil spring 10, the first spring portion 50 includes a transition convolution 51 and two helical intermediate convolutions 52, 53 extending from the transition convolution 51 to the lower end 12 of the coil-in-coil spring 10. Each of the helical intermediate convolutions 52, 53 of the first spring portion 50 has a respective diameter, which are substantially the same and are substantially equal to the diameter of the transition convolution 51 of the first spring portion 50 as well as the diameter of the lower end 12 of the coil-in-coil spring 10, such that the first spring portion 50 has a substantially cylindrical shape. The continuous wire 20 also defines a pitch between each of the plurality of helical intermediate convolutions 52, 53 of the first spring portion 50 with the pitch between each of the helical intermediate convolutions 52, 53 of the first spring portion 50 being substantially the same.

Turning now to the second spring portion 60 of the coil-in-coil spring 10, the second spring portion 60 includes an upper end convolution 67 and six helical intermediate convolutions 61, 62, 63, 64, 65, 66 that extend from the lower end 12 of the coil-in-coil spring 10 to the upper end convolution 67 of the second spring portion 60. Each of the helical intermediate convolutions 61, 62, 63, 64, 65, 66 of the second spring portion 60 has a respective diameter, which are substantially the same and are substantially equal to the diameter of the upper end convolution 67 of the second spring portion 60 such that the second spring portion 60 has a substantially cylindrical shape. The continuous wire 20 also defines a pitch between each of the plurality of helical intermediate convolutions 61, 62, 63, 64, 65, 66 of the second spring portion 60 with the pitch between each of the plurality of helical intermediate convolutions 61, 62, 63, 64, 65, 66 of the second spring portion 60 being less than the pitch between each of the plurality of helical intermediate convolutions 52, 53 of the first spring portion 50.

Turning now to the third spring portion 70 of the coil-in-coil spring 10, the third spring portion 70 includes the upper end convolution 71 and further includes three helical intermediate convolutions 72, 73, 74 that extend from the upper end convolution 71 of the third spring portion 70 to the transition convolution 51 of the first spring portion 50. Each of the plurality of helical intermediate convolutions 72, 73, 74 of the third spring portion 70 has a respective diameter with the diameter of each of the plurality of helical intermediate convolutions 72, 73, 74 progressively increasing as the plurality of helical intermediate convolutions 72, 73, 74 extends from the upper end convolution 71 of the third spring portion 70 to the transition convolution 51 of the first spring portion 50. In particular, the diameter of the first helical intermediate convolution 72 is slightly larger than the diameter of the upper end convolution 71, the diameter of the second helical intermediate convolution 73 is slightly larger than the diameter of the first helical intermediate convolution 72, and the diameter of the third helical intermediate convolution 74 is slightly larger than the diameter of the second helical intermediate convolution 73, such that the third spring portion 70 has a substantially conical shape. In the exemplary coil-in-coil spring 10 shown in FIG. 1, the diameter of the third helical intermediate convolution 74 of the third spring portion 70 is substantially the same as the diameter of the transition convolution 51 of the first spring portion 50, but, without departing from the spirit and scope of the present invention, it is contemplated that the third spring portion 70 could also be formed such that the diameter of the third helical intermediate convolution 74 of the third spring portion 70 is slightly less than the diameter of the transition convolution 51 of the first spring portion 50.

With further regard to the third spring portion 70, the continuous wire 20 again defines a pitch between each of the plurality of helical intermediate convolutions 72, 73, 74 of the third spring portion 70. Specifically, the pitch between each of the plurality of helical intermediate convolutions 72, 73, 74 of the third spring portion 70 is substantially the same, but with the pitch between each of the plurality of helical intermediate convolutions 72, 73, 74 of the third spring portion 70 being less than the pitch between each of the plurality of helical intermediate convolutions 52, 53 of the first spring portion 50 and also being less than the pitch between each of the plurality of helical intermediate convolutions 61, 62, 63, 64, 65, 66 of the second spring portion 60.

As a result of the above-described variance in the pitches and diameters along the length of the continuous wire 20, in the exemplary coil-in-coil spring 10 of FIG. 1, the first spring portion 50 has a first spring constant, the second spring portion 60 has a second spring constant greater than the first spring constant, and the third spring portion 70 has a third spring constant less_than the first spring constant of the first spring portion 50 and also less than the second spring constant of the second spring portion 60. The different spring constants along with the relative positions of the first spring portion 50, the second spring portion 60, and the third spring portion 70, in turn, results in the coil-in-coil spring 10 having a variable loading response upon compression. More specifically, as the coil-in-coil spring 10 is compressed, the overall spring constant of the coil-in-coil spring 10 changes as different combinations of the first spring portion 50, the second spring portion 60, and the third spring portion 70 are engaged and begin to compress, as described in detail below.

In operation, the first spring portion 50 and the third spring portion 70 of the outer coil 30 of the coil-in-coil spring 10 function substantially as two helical springs in series, whereas the outer coil 30 and the inner coil 40 function substantially as two helical springs in parallel. As discussed above, the uncompressed height $H_{outer}$ of the outer coil 30 is greater than the uncompressed height $H_{inner}$ of the inner coil 40. As such, when a force is first applied to the coil-in-coil spring 10 only the outer coil 30 begins to compress and the coil-in-coil spring 10 therefore compresses according to the spring constant of the outer coil 30. Once the coil-in-coil spring 10 is compressed to the point where the compressed height of the outer coil 30 is equal to the uncompressed height $H_{inner}$ of the inner coil 40 (i.e., the second spring portion 60), the inner coil 40 is engaged and the coil-in-coil spring 10 compresses according to the combined spring constant of the outer coil 30 and the inner coil 40. By forming the inner coil 40 with an uncompressed height $H_{inner}$ less than the uncompressed $H_{outer}$ of the outer coil 30, the coil-in-coil spring 10 therefore exhibits at least two different loading responses.

Furthermore, and independent of the inner coil 40, as the outer coil 30 compresses, initially both the first spring portion 50 and the third spring portion 70 simultaneously compress. At some predetermined compression distance, the third spring portion 70 becomes fully compressed. That is to say, the plurality of helical intermediate convolutions 72, 73, 74 of the third spring portion 70 are unable to compress any further and the third spring portion 70 becomes deactivated. However, at the compression distance when the third spring portion 70 is deactivated, the first spring portion 50 is still capable of additional compression. Therefore, for compression distances past the point where the third spring portion 70 becomes deactivated, the outer coil 30 compresses according to the spring constant of only the first spring portion 50. As such, the outer coil 30 itself also exhibits at least two different loading responses.

Figure 2:
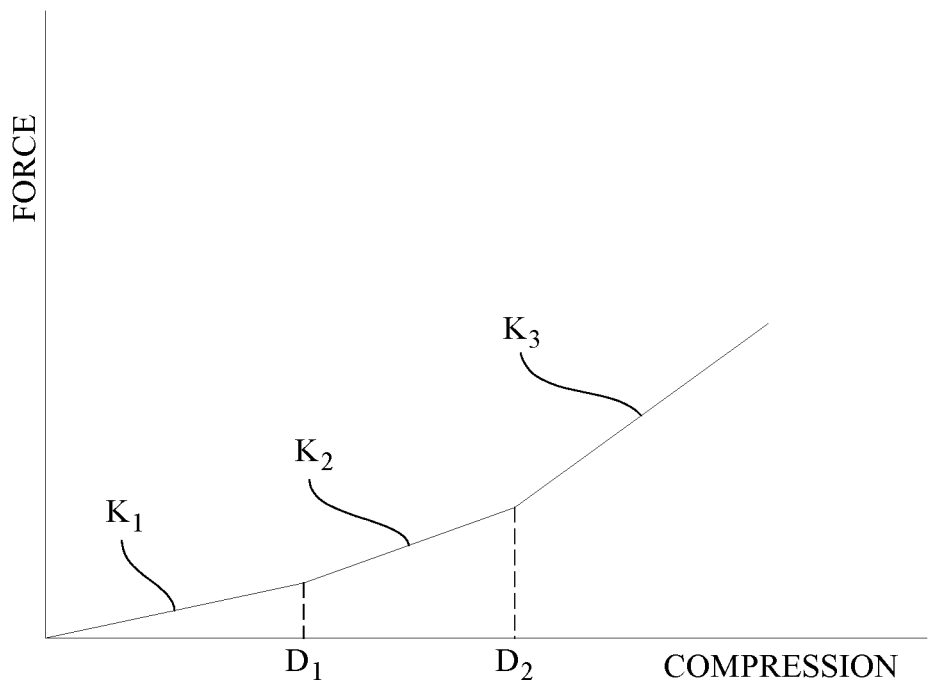
FIG. 2 is a graph depicting the forces necessary to maintain compression distances of the exemplary coil-in-coil spring of FIG. 1.

Referring now to FIG. 2, which graphically depicts the forces necessary to maintain compression distances of the exemplary coil-in-coil spring 10, the overall spring constant of the coil-in-coil spring 10 is the slope of the line at any given compression distance. As shown in the graph, the coil-in-coil spring 10 initially compresses according to a first overall spring constant $K_1$ until reaching a first compression distance $D_1$. As discussed above, during this initial compression to the first compression distance $D_1$, the second spring portion 60 (i.e., the inner coil 40) is not yet engaged, but both the first spring portion 50 and the third spring portion 70 which form the outer coil 30 simultaneously compress. As such, the first overall spring constant $K_1$ of the coil-in-coil spring 10 is based on the first spring constant of the first spring portion 50 and the third spring constant of the third spring portion 70 which form the outer coil 30.

After compressing the coil-in-coil spring 10 past the first compression distance $D_1$, further compression of the coil-in-coil spring 10 is according to a second overall spring constant $K_2$ which is greater than the first overall spring constant $K_1$. During this stage of compression, the second spring portion 60 (i.e., the inner coil 40) is engaged along with the first spring portion 50 and the third spring portion 70 which form the outer coil 30. Furthermore, the third spring portion 70 is not yet deactivated such that the both the first spring portion 50 and the third spring portion 70 of the outer coil 30 are simultaneously compressing. As such, the second overall spring constant $K_2$ of the coil-in-coil spring 10 is based on the first spring constant of the first spring portion 50, the second spring constant of the second spring portion 60, and the third spring constant of the third spring portion 70. Compression of the coil-in-coil spring 10 continues according to the second overall spring constant $K_2$ until the coil-in-coil spring reaches a second compression distance $D_2$.

Finally, after compressing the coil-in-coil spring 10 past the second compression distance $D_2$, further compression of the coil-in-coil spring 10 is according to a third overall spring constant $K_3$ which is greater than the second overall spring constant $K_2$. During this stage of compression, the second spring portion 60 (i.e., the inner coil 40) is engaged but the third spring portion 70 is deactivated such that of the outer coil 30 only the first spring portion 50 is compressing. As such, the third overall spring constant $K_3$ of the coil-in-coil spring 10 is based on the first spring constant of the first spring portion 50 and the second spring constant of the second spring portion 60. Compression of the coil-in-coil spring 10 continues according to the third overall spring constant $K_3$ until the coil-in-coil spring 10 reaches a maximum compression.

Although in the exemplary coil-in-coil spring 10 described above, the third spring portion 70 deactivates at a compression distance greater than the compression distance when the second spring portion 60 is engaged, it is understood that by changing the configuration of the first spring portion, the second spring portion, and/or the third spring portion of the coil-in-coil spring that, in some other embodiments of the present invention, the third portion of the coil-in-coil spring can be configured to deactivate before the second spring portion is engaged or to deactivate simultaneously with the second spring portion becoming engaged. Furthermore, it should be understood that the above descriptions of the spring portions of the coil-in-coil are merely one exemplary embodiment of the present invention and that spring portions having, for example, different numbers of coils, coil diameters, and/or pitches can also be included in an exemplary coil-in-coil spring without departing from the spirit and scope of the present invention.

Figure 3:
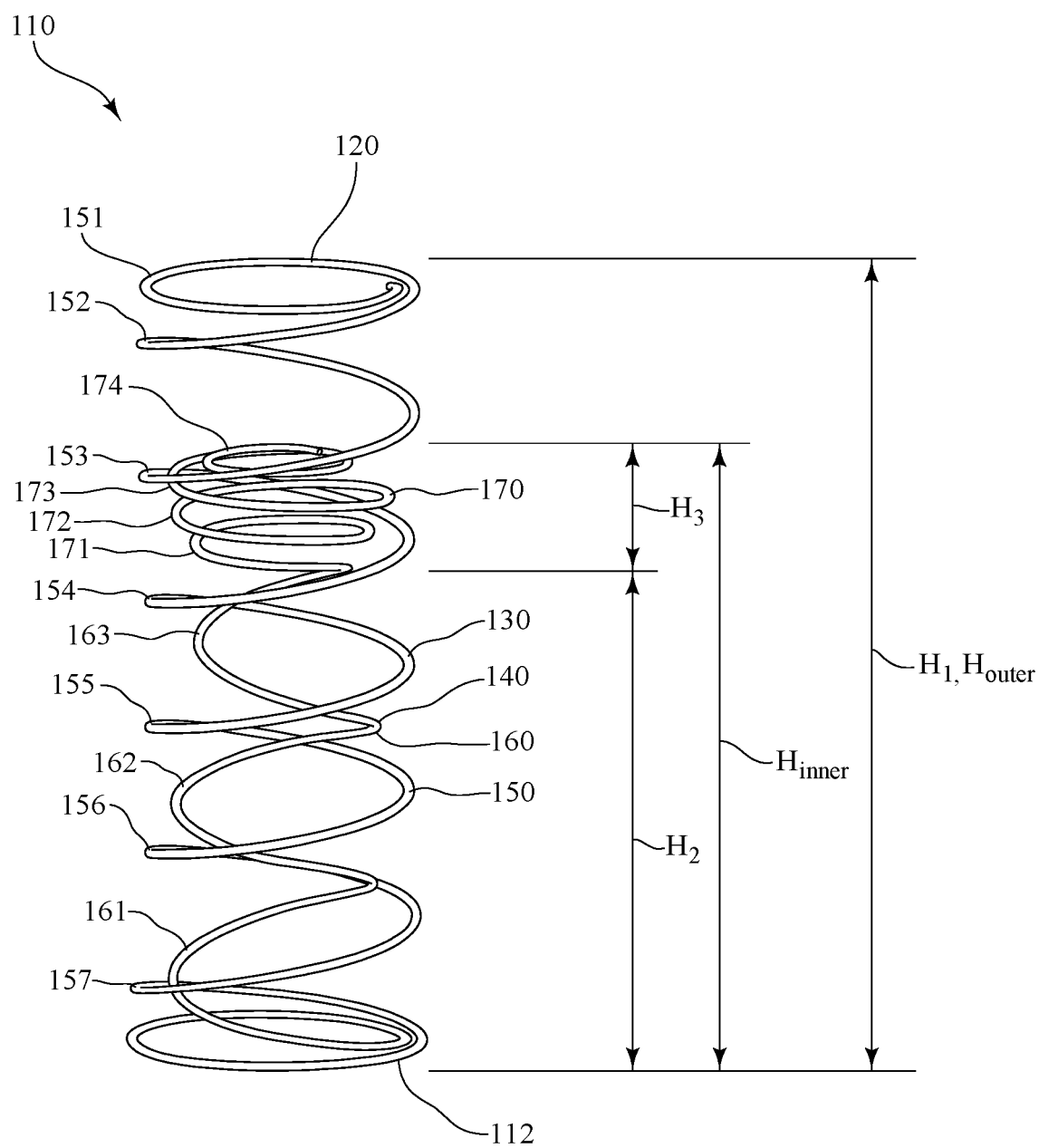
FIG. 3 is a side view of another exemplary coil-in-coil spring made in accordance with the present invention.

Referring now to FIG. 3, in another exemplary embodiment of the present invention, a coil-in-coil spring 110 is provided that also exhibits a variable loading response. Similar to the coil-in-coil spring 10 described above with reference to FIG. 1, the coil-in-coil spring 110 is also comprised of a continuous wire 120 forming an outer coil 130 and an inner coil 140, which is positioned within the outer coil 130. The continuous wire 120 also forms a first spring portion 150, a second spring portion 160, and a third spring portion 170, which collectively form the outer coil 130 and the inner coil 140 of the coil-in-coil spring 110. However, in the coil-in-coil spring 110 shown in FIG. 3, the second spring portion 160 and the third spring portion 170 are both positioned within the first spring portion 150, with the third spring portion 170 being positioned above the second spring portion 160. As such, the second spring portion 160 and the third spring portion 170 collectively form the inner coil 140 of the coil-in-coil spring 110 and the first spring portion 150 forms the outer coil 140 of the coil-in-coil spring 110.

Furthermore, in the coil-in-coil spring 110, the first spring portion 150 has an uncompressed height $H_1$, the second spring portion 160 has an uncompressed height $H_2$, and the third spring portion 170 has an uncompressed height $H_3$. As shown in FIG. 3, the outer coil 130 has an uncompressed height $H_{outer}$, which is essentially the uncompressed height $H_1$ of the first spring portion 150, and which is greater than the uncompressed height $H_{inner}$ of the inner coil 140, which is substantially the same as the uncompressed height $H_2$ of the second spring portion 160 plus the uncompressed height $H_3$ of the third spring portion 170. In particular, in the coil-in-coil spring 110, the uncompressed height $H_1$ of the first spring portion 150 is about 225 mm, the uncompressed height $H_2$ of the second spring portion 160 is about 133 mm, and the uncompressed height $H_3$ of the third spring portion 170 is about 42 mm. Furthermore, in the coil-in-coil spring 110, the first spring portion 150 has a diameter of about 82 mm, while the second spring portion 160 has a diameter of about 55 mm. Again though, the foregoing dimensions are but one example, and numerous other exemplary coil-in-coil springs having similar arrangements, but including alternative dimensions can also be produced without departing from the spirit and scope of the present invention.

Of note, and similar to the coil-in-coil spring 10 described above with reference to FIG. 1, a lower end 112 of the coil-in-coil spring 110 forms a substantially planar loop at the lowermost portion of the coil-in-coil spring 110. In the coil-in-coil spring 110, however, the first spring portion 150 includes an upper end convolution 151, which forms a substantially planar loop at the topmost portion of the coil-in-coil spring 110. In this way though, and like the coil-in-coil spring 10 described above with reference to FIG. 1, the coil-in-coil spring 110 shown in FIG. 3 still terminates at either end in generally planar forms, which serve as the supporting end structures of the coil-in-coil spring 110.

Referring still to FIG. 3, and with further respect to the first spring portion 150, the second spring portion 160, and the third spring portion 170 of the coil-in-coil spring 110, the first spring portion 150 includes an upper end convolution 151, and further includes six helical intermediate convolutions 152, 153, 154, 155, 156, 157, which extend from the upper end convolution 151 to the lower end 112 of the coil-in-coil spring 110. Each of the plurality of helical intermediate convolutions 152, 153, 154, 155, 156, 157 of the first spring portion 150 has a respective diameter, which are substantially the same and are substantially equal to the diameter of the upper end convolution 151 of the first spring portion 150, as well as to the diameter of the lower end 112 of the coil-in-coil spring 110, such that the first spring portion 150 formed by the continuous wire 120 has a substantially cylindrical shape. The continuous wire 120 also defines a pitch between each of the plurality of helical intermediate convolutions 152, 153, 154, 155, 156, 157 of the first spring portion 150 with the pitch between each of the plurality of helical intermediate convolutions 152, 153, 154, 155, 156, 157 of the first spring portion 150 being substantially the same.

Turning now to the second spring portion 160 of the coil-in-coil spring 110, the second spring portion 160 includes a transition convolution 163 and two helical intermediate convolutions 161, 162 extending from the lower end 112 of the coil-in-coil spring 110 to the transition convolution 163. Each of the plurality of helical intermediate convolutions 161, 162 of the second spring portion 160 has a respective diameter, which are substantially the same and are substantially equal to the diameter of the transition convolution 163 of the second spring portion 160, such that the second spring portion 160 also has a substantially cylindrical shape. In this regard, the continuous wire 120 defines a pitch between each of the plurality of helical intermediate convolutions 161, 162 of the second spring portion 160, with each of the pitches being substantially the same, and with each pitch being less than the pitch between each of the plurality of helical intermediate convolutions 152, 153, 154, 155, 156, 157 of the first spring portion 150.

Turning now to the third spring portion 170 of the coil-in-coil spring 110, the third spring portion 170 includes an upper end convolution 174 and three helical intermediate convolutions 171, 172, 173 that extend from the transition convolution 163 of the second spring portion 160 to the upper end convolution 174 of the third spring portion 170. Each of the plurality of helical intermediate convolutions 171, 172, 173 of the third spring portion 170 has a respective diameter with the diameter of each of the plurality of helical intermediate convolutions 171, 172, 173 progressively increasing as the plurality of helical intermediate convolutions 171, 172, 173 extend from the transition convolution 163 of the second spring portion 160 to the upper end convolution 174 of the third spring portion 170. In particular, the diameter of the second helical intermediate convolution 172 is slightly larger than the diameter of the first helical intermediate convolution 171 and the diameter of the third helical intermediate convolution 173 is slightly larger than the diameter of the second helical intermediate convolution 172, such that the third spring portion 170 has an inverted conical shape. In the exemplary coil-in-coil spring 110 shown in FIG. 3, the diameter of the upper end convolution 174 of the third spring portion 170 is slightly smaller than the diameter of the third helical intermediate convolution 173 of the third spring portion 170, but, without departing from the spirit and scope of the present invention, it is contemplated that the third spring portion 170 could also be formed such that the diameter of the upper end convolution 174 of the third spring portion 170 is substantially the same as the diameter of the third helical intermediate convolution 173 of the third spring portion 170 or slightly larger than the diameter of the third helical intermediate convolution 173 of the third spring portion 170.

With further regard to the third spring portion 170, the continuous wire 120 also defines a pitch between each of the plurality of helical intermediate convolutions 171, 172, 173 of the third spring portion 170. Specifically, the pitch between each of the plurality of helical intermediate convolutions 171, 172, 173 of the third spring portion 170 is substantially the same, with the pitch between each of the plurality of helical intermediate convolutions 171, 172, 173 of the third spring portion 170 being less than the pitch between each of the plurality of helical intermediate convolutions 152, 153, 154, 155, 156, 157 of the first spring portion 150 and also being less than the pitch between each of the plurality of helical intermediate convolutions 161, 162 of the second spring portion 160.

Similar to the coil-in-coil spring 10 described above with reference to FIG. 1, in the coil-in-coil spring 110 of FIG. 3, the first spring portion 150 thus has a first spring constant, the second spring portion 160 has a second spring constant greater than the first spring constant, and the third spring portion 170 has a third spring constant, which is greater than the first spring constant of the first spring portion 150 and is also less than the second spring constant of the second spring portion 160. In this regard, the different spring constants along with the relative positions of the first spring portion 150, the second spring portion 160, and the third spring portion 170 again results in the overall spring constant of the coil-in-coil spring 110 changing during compression, as different combinations of the first spring portion 150, the second spring portion 160, and the third spring portion 170 are engaged and begin to compress, as discussed below.

In operation, in the coil-in-coil spring 110, the second spring portion 160 and the third spring portion 170 of the inner coil 140 of the coil-in-coil spring 110 function substantially as two helical springs in series, whereas the outer coil 130 and the inner coil 140 function substantially as two helical springs in parallel. As discussed above, the uncompressed height $H_{outer}$ of the outer coil 130 is greater than the uncompressed height $H_{inner}$ of the inner coil 140. As such, when a force is first applied to the coil-in-coil spring 110 only the outer coil 130 (i.e., the first spring portion 150) compresses and the coil-in-coil spring 110 compresses according to the spring constant of the outer coil 130. During this initial compression, the first overall spring constant $K_1$ of the coil-in-coil spring 110 is based only on the first spring constant of the first spring portion 150.

Once the coil-in-coil spring 110 is then compressed to the point where the compressed height of the outer coil 130 is equal to the uncompressed height $H_{inner}$ of the inner coil 140 (i.e., the uncompressed height $H_2$ of the second spring portion 160 plus the uncompressed height $H_3$ of the third spring portion 170), the inner coil 140 is engaged and the coil-in-coil spring 110 compresses according to the combined spring constant of the outer coil 130 and the inner coil 140. During this stage of compression, the second spring portion 160 and the third spring portion 170, which form the inner coil 140, are both engaged such that the both the second spring portion 160 and the third spring portion 170 of the inner coil 140 are simultaneously compressing. As such, the second overall spring constant $K_2$ of the coil-in-coil spring 110 is based on the first spring constant of the first spring portion 150, the second spring constant of the second spring portion 160, and the third spring constant of the third spring portion 170.

Upon further compression and at a predetermined compression distance, the third spring portion 170 then becomes fully compressed and is deactivated, while the second spring portion 160 is still capable of additional compression. After the third spring portion 170 becomes deactivated, the inner coil 140 then compresses according to the spring constant of only the second spring portion 160. As such, the third overall spring constant $K_3$ of the coil-in-coil spring 110 is based on the first spring constant of the first spring portion 150 and the second spring constant of the second spring portion 160. Compression of the coil-in-coil spring 110 subsequently continues according to the third overall spring constant $K_3$ until the coil-in-coil spring 110 reaches a maximum compression. In other words, the coil-in-coil spring 110 shown in FIG. 3 therefore has a spring constant that increases as the coil-in-coil spring 110 compresses to provide an increasing level of support in response to additional loading.

Figure 4:
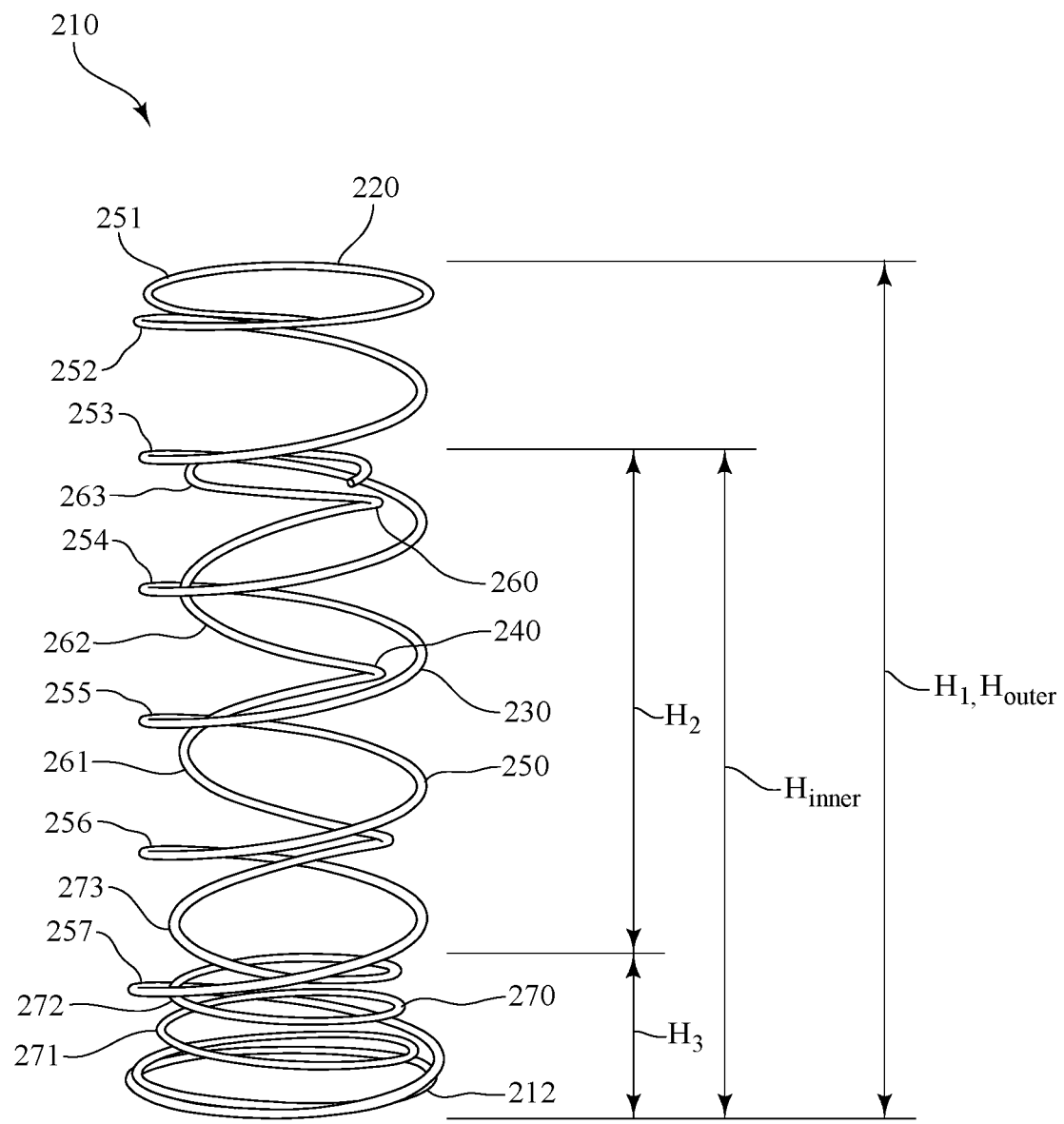
FIG. 4 is a side view of another exemplary coil-in-coil spring made in accordance with the present invention.

As a further refinement to the exemplary coil-in-coil spring of the present invention, in some embodiments, the third spring portion can also be positioned below the second spring portion rather than above the second spring portion. Referring now to FIG. 4, in another exemplary embodiment of the present invention, and similar to the coil-in-coil spring 110 shown in FIG. 3, a coil-in-coil spring 210 is provided that is comprised of a continuous wire 220 forming an outer coil 230 and an inner coil 240, which is positioned within the outer coil 230. The continuous wire 220 also forms a first spring portion 250, a second spring portion 260, and a third spring portion 270, which collectively form the outer coil 230 and the inner coil 240 of the coil-in-coil spring 210. Furthermore, the second spring portion 260 and the third spring portion 270 are also both positioned within the first spring portion 250, such that the second spring portion 260 and the third spring portion 270 form the inner coil 240 of the coil-in-coil spring 210 and the first spring portion 250 forms the outer coil 230 of the coil-in-coil spring 210. Also like the coil-in-coil spring 110 shown in FIG. 3, in the coil-in-coil spring 210 of FIG. 4, the first spring portion 250 has an uncompressed height $H_1$, the second spring portion 260 has an uncompressed height $H_2$, and the third spring portion 270 has an uncompressed height $H_3$. Likewise, the outer coil 230 has an uncompressed height $H_{outer}$, which is equal to the uncompressed height of the first spring portion 250 and is greater than the uncompressed height of the inner coil 240, $H_{inner}$, which, in turn, is substantially equal to the uncompressed height $H_2$ of the second spring portion 260 plus the uncompressed height $H_3$ of the third spring portion 270. Similarly, in the coil-in-coil spring 210, the uncompressed height $H_1$ of the first spring portion 250 is about 225 mm, the uncompressed height $H_2$ of the second spring portion 260 is about 133 mm, and the uncompressed height $H_3$ of the third spring portion 270 is about 42 mm. Once again though, the foregoing dimensions are but one example, and numerous other exemplary coil-in-coil springs having similar arrangements to that shown in FIG. 4, but including alternative dimensions can further be produced without departing from the spirit and scope of the present invention.

Referring still to FIG. 4, the first spring portion 250 of the coil-in-coil spring 210 of FIG. 4 is also substantially identical to the first spring portion 150 described above with reference to FIG. 3, and includes an upper end convolution 251 and six helical intermediate convolutions 252, 253, 254, 255, 256, 257 extending from the upper end convolution 251 to a lower end 212 of the coil-in-coil spring 210. That is to say, each of the plurality of helical intermediate convolutions 252, 253, 254, 255, 256, 257 of the first spring portion 250 has a respective diameter that are substantially the same (e.g., about 82 mm), and each pitch between the plurality of helical intermediate convolutions 252, 253, 254, 255, 256, 257 is substantially the same as well.

Unlike the coil-in-coil spring 110 shown in FIG. 3, however, the third spring portion 270 is not positioned above the second spring portion 260. Rather, in the coil-in-coil spring shown in FIG. 4, the third spring portion 270 is positioned below the second spring portion 260, and includes a transition convolution 273 and two helical intermediate convolutions 271, 272 that extend from the lower end 212 of the coil-in-coil spring 210 to the transition convolution 273. Each of the plurality of helical intermediate convolutions 271, 272 of the third spring portion 270 has a respective diameter with the diameter of each of the plurality of helical intermediate convolutions 271, 272 progressively decreasing as the plurality of helical intermediate convolutions 271, 272 extend from the lower end 212 of the coil-in-coil spring 210 to the transition convolution 273. In particular, the diameter of the first helical intermediate convolution 271 is slightly smaller than the lower end 212 of the coil-in-coil spring 210, the diameter of the second helical intermediate convolution 272 is slightly smaller than the diameter of the first helical intermediate convolution 271, and the diameter of the transition convolution 273 is slightly smaller than the diameter of the second helical intermediate convolution 272, such that the continuous wire 220 forming the third spring portion 270 has a substantially conical shape. The continuous wire 220 also defines a pitch between each of the plurality of helical intermediate convolutions 271, 272 of the third spring portion 270, with the pitch between each of the plurality of helical intermediate convolutions 271, 272 of the third spring portion 270 being substantially the same and being less than the pitch between each of the plurality of helical intermediate convolutions 252, 253, 254, 255, 256, 257 of the first spring portion 250.

Turning now to the second spring portion 260 of the coil-in-coil spring 210, the second spring portion 260 then includes an upper end convolution 263 and two of helical intermediate convolutions 261, 262 that extend from the transition convolution 273 of the third spring portion 270 to the upper end convolution 263 of the second spring portion 260. Each of the plurality of helical intermediate convolutions 261, 262 of the second spring portion 260 has a respective diameter (e.g., about 37 mm), which are substantially the same and are substantially equal to the diameter of the transition convolution 273 of the third spring portion 270, such that the continuous wire 220 forming the second spring portion 260 has a substantially cylindrical shape. The continuous wire 220 further defines a pitch between each of the plurality of helical intermediate convolutions 261-262 of the second spring portion 260. Specifically, the pitch between each of the plurality of helical intermediate convolutions 261, 262 of the second spring portion 260 is substantially the same, but with the pitch between each of the plurality of helical intermediate convolutions 261, 262 of the second spring portion 260 being less than the pitch between each of the plurality of helical intermediate convolutions 252, 253, 254, 255, 256, 257 of the first spring portion 250 and greater than the pitch between each of the plurality of helical intermediate convolutions 271, 272 of the third spring portion 270. For example, in the coil-in-coil spring 210, the pitch between each of the plurality of helical intermediate convolutions 252, 253, 254, 255, 256, 257 of the first spring portion 250 is typically about 61 mm, while the pitch between the plurality of helical intermediate convolutions 261, 262 of the second spring portion 260 is about 14-15 mm and the pitch between each of the plurality of helical intermediate convolutions 271, 272 of the third spring portion 270 is about 10 mm to about 12 mm.

Similar to the coil-in-coil springs 10, 110 described above with reference to FIGS. 1 and 3, in the coil-in-coil spring 210 of FIG. 4, the first spring portion 250 has a first spring constant, the second spring portion 260 has a second spring constant greater than the first spring constant, and the third spring portion 270 has a third spring constant greater than the first spring constant of the first spring portion 250 and also less than the second spring constant of the second spring portion 260. The different spring constants along with the relative positions of the first spring portion 250, the second spring portion 260, and the third spring portion 270 results in the overall spring constant of the coil-in-coil spring 210 changing during compression as different combinations of the first spring portion 250, the second spring portion 260, and the third spring portion 270 are engaged and begin to compress as discussed below.

The coil-in-coil spring 210 shown in FIG. 4 operates in substantially the same manner as the coil-in-coil spring 110 shown in FIG. 3, with a first overall spring constant $K_1$ of the coil-in-coil spring 210 being based only on the first spring constant of the first spring portion 250, a second overall spring constant $K_2$ of the coil-in-coil spring 210 being based on the first spring constant of the first spring portion 250, the second spring constant of the second spring portion 260, and the third spring constant of the third spring portion 270, and a third overall spring constant $K_3$ of the coil-in-coil spring 210 being based on the first spring constant of the first spring portion 250 and the second spring constant of the second spring portion 260 due to the third spring portion 270 becoming fully compressed and deactivated after being compressed a predetermined distance. The coil-in-coil spring 210 shown in FIG. 4 therefore has a spring constant which increases as the coil-in-coil spring 210 compresses to provide an increasing level of support in response to additional loading.

Figure 5:
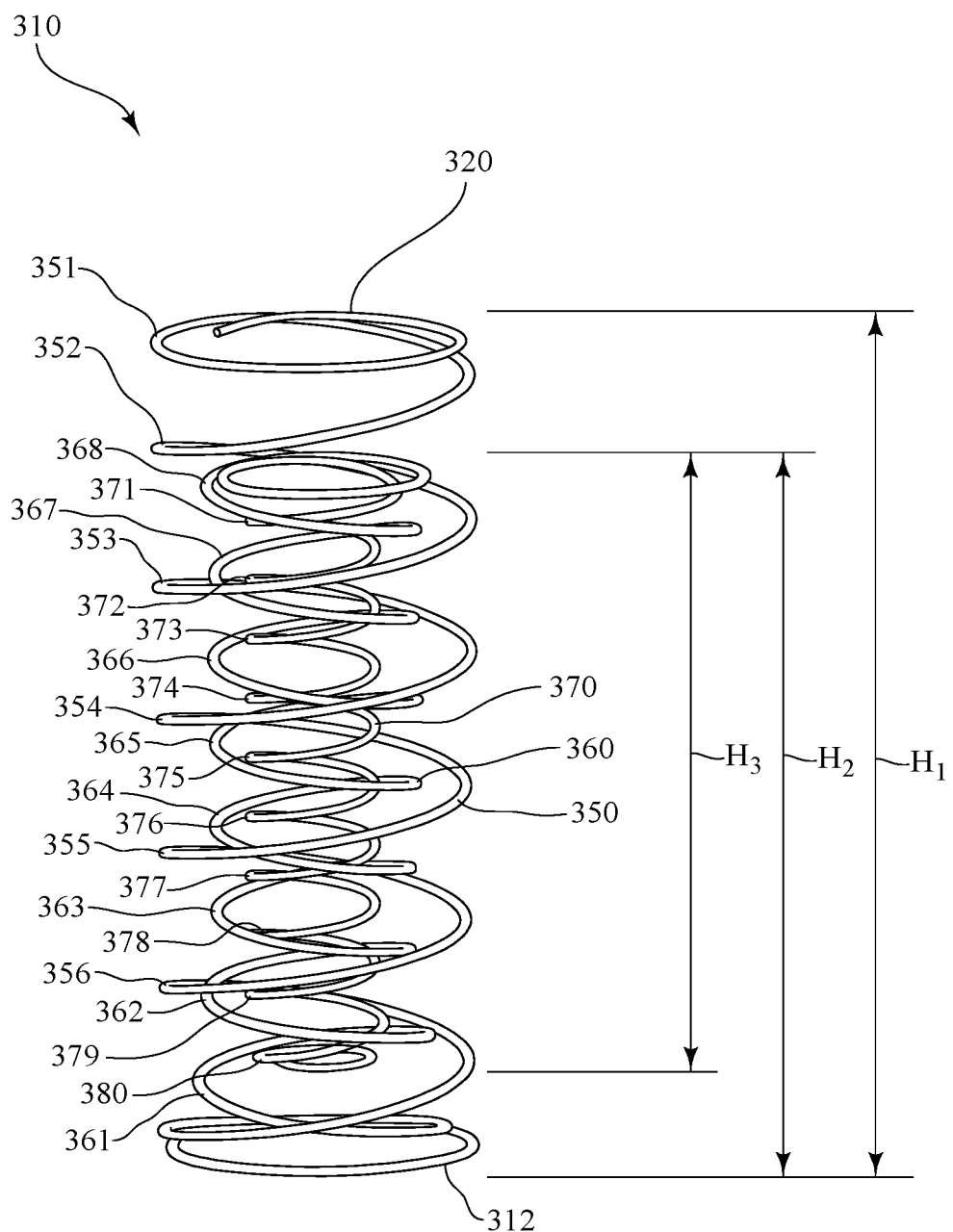
FIG. 5 is a side view of another exemplary coil-in-coil spring made in accordance with the present invention.

As yet another refinement to the present invention, in addition to varying the arrangement of portions of a coil-in-coil spring to provide a variable loading response, additional intermediate coils can also be positioned between the inner coil and the outer coil to provide variation in a loading response. Referring now to FIG. 5, in another exemplary embodiment of the present invention, a multi-coil spring 310 is provided that is comprised of a continuous wire 320 forming an outer coil 350, an intermediate coil 360 positioned within the outer coil 350, and an inner coil 370 positioned within the intermediate coil 360 with the outer coil 350, the intermediate coil 360, and the inner coil 370 all formed of a plurality of convolutions of the continuous wire 320 and having various uncompressed heights. In particular, the outer coil 350 has an uncompressed height $H_1$, the intermediate coil 360 has an uncompressed height $H_2$ that is less than the uncompressed height $H_1$ of the outer coil 350, and the inner coil 370 has an uncompressed height $H_3$ that is less than the uncompressed height $H_2$ of the intermediate coil 360. More specifically, in the coil-in-coil spring 310, the uncompressed height $H_1$ of the outer coil 350 is about 226 mm, the uncompressed height $H_2$ of the intermediate coil 360 is about 133 mm, and the uncompressed height $H_3$ of the inner coil 370 is about 42 mm. Again though, the foregoing dimensions are but one example, and numerous other exemplary coil-in-coil springs having similar arrangements, but including alternative dimensions can also be produced without departing from the spirit and scope of the present invention.

Referring still to FIG. 5, the outer coil 350 of the multi-coil spring 310 includes an upper end convolution 351 and a plurality of helical intermediate convolutions 352, 353, 354, 355, 356 that extend from the upper end convolution 351 of the outer coil 350 to a lower end 312 of the multi-coil spring 310. Each of the plurality of helical intermediate convolutions 352, 353, 354, 355, 356 of the outer coil 350 has a respective diameter (e.g., about 82 mm), which are substantially the same and are substantially equal to the diameter of the upper end convolution 351 of the outer coil 350 as well as to the diameter of the lower end 312 of the multi-coil spring 310, such that the continuous wire 320 forming the outer coil 350 has a substantially cylindrical shape. The continuous wire 320 also defines a pitch between each of the plurality of helical intermediate convolutions 352, 353, 354, 355, 356 of the outer coil 350, with the pitch between each of the plurality of helical intermediate convolutions 352, 353, 354, 355, 356 of the outer coil 350 being substantially the same.

The intermediate coil 360 includes an upper end convolution 368 and a plurality of helical intermediate convolutions 361, 362, 363, 364, 365, 366, 367 that extend from the lower end 312 of the multi-coil spring 310 to the upper end convolution 368 of the intermediate coil 360. Each of the plurality of helical intermediate convolutions 361, 362, 363, 364, 365, 366, 367 of the intermediate coil 360 has a respective diameter (e.g. about 55 mm), which are all substantially the same and are substantially equal to the diameter of the upper end convolution 368 of the intermediate coil 360, such that the continuous wire 320 forming the intermediate coil 360 has a substantially cylindrical shape. Furthermore, the diameter of each the plurality of helical intermediate convolutions 361, 362, 363, 364, 365, 366, 367 and the upper end convolution 368 of the intermediate coil 360 is less than the diameter each of the convolutions of the outer coil 350, such that the intermediate coil 360 does not contact the outer coil 350 when the multi-coil spring 310 is compressed. The continuous wire 320 also defines a pitch between each of the plurality of helical intermediate convolutions 361, 362, 363, 364, 365, 366, 367 of the intermediate coil 360. Specifically, the pitch between each of the plurality of helical intermediate convolutions 361, 362, 363, 364, 365, 366, 367 of the intermediate coil 360 is substantially the same and is less than the pitch between each of the plurality of helical intermediate convolutions 352, 353, 354, 355, 356 of the outer coil 350.

Turning now to the inner coil 370, the inner coil 370 includes a lower end convolution 380 and a plurality of helical intermediate convolutions 371, 372, 373, 374, 375, 376, 377, 378, 379 that extend from the upper end convolution 368 of the intermediate coil 360 to the lower end convolution 380 of the inner coil 370. Each of the plurality of helical intermediate convolutions 371, 372, 373, 374, 375, 376, 377, 378, 379 of the inner coil 370 has a respective diameter (e.g., about 35 mm), which are all substantially the same and are substantially equal to the diameter of the lower end convolution 380 of the inner coil 370, such that the continuous wire 320 forming inner coil 370 also has a substantially cylindrical shape. However, the diameter of each the plurality of helical intermediate convolutions 371, 372, 373, 374, 375, 376, 377, 378, 379 and the lower end convolution 380 of the inner coil 370 is less than the diameter each of the convolutions of the intermediate coil 360, such that the inner coil 370 does not contact the intermediate coil 360 when the multi-coil spring 310 is compressed. The continuous wire 320 also defines a pitch between each of the plurality of helical intermediate convolutions 371, 372, 373, 374, 375, 376, 377, 378, 379 of the inner coil 370, with the pitch between each of the plurality of helical intermediate convolutions 371, 372, 373, 374, 375, 376, 377, 378, 379 of the inner coil 370 being substantially the same and being less than the pitch between each of the plurality of helical intermediate convolutions 361, 362, 363, 364, 365, 366, 367 of the intermediate coil 360.

In operation, the outer coil 350, the intermediate coil 360, and the inner coil 370 function substantially as three helical springs in parallel. As discussed above, the uncompressed height $H_2$ of the intermediate coil 360 is less than the uncompressed height $H_1$ of the outer coil 350 and the uncompressed height $H_3$ of the inner coil 370 is less than the uncompressed height $H_2$ of the intermediate coil 360. As such, when a force is first applied to the multi-coil spring 310, only the outer coil 350 is engaged and compresses so that the first overall spring constant $K_1$ of the multi-coil spring 310 is based only on the spring constant of the outer coil 350. Once the multi-coil spring 310 is compressed to the point where the compressed height of the outer coil 350 is equal to the uncompressed height $H_2$ of the intermediate coil 360, the intermediate coil 360 is then engaged and begins to compress along with the outer coil 350 so that the second overall spring constant $K_2$ of the multi-coil spring 310 is based on the spring constant of the outer coil 350 and the spring constant of the intermediate coil 360. Application of further force to the multi-coil spring 310 subsequently results in compression of both the outer coil 350 and the intermediate coil 360, but the inner coil 370 remains unengaged. Once the multi-coil spring 310 is compressed to the point where the compressed height of the outer coil 350 and the compressed height of the intermediate coil 360 is equal to the uncompressed height $H_3$ of the inner coil 370, however, the inner coil 370 is engaged and begins to compress along with the outer coil 350 and the intermediate coil 360 so that the third overall spring constant $K_3$ of the multi-coil spring 310 is based on the spring constant of the outer coil 350, the spring constant of the intermediate coil 360, and the spring constant of the inner coil 370. The multi-coil spring 310 shown in FIG. 5 therefore has a spring constant that also increases as the multi-coil spring 310 compresses to provide an increasing level of support in response to additional loading.

Regardless of the particular configuration of the exemplary coil-in-coil springs or multi-coil springs, in some embodiments of the present invention, each of the coil-in-coil springs, can further be included in a mattress to provide a user with the non-linear support typically seen in a foam mattress, but through the use of coil-in-coil or multi-coil springs. For example, and referring now to FIG. 6, in another embodiment of the present invention, a mattress 500 is provided that includes a plurality of the coil-in-coil springs 10 described above with reference to FIG. 1. Each of the plurality of coil-in-coil springs 10 is encased in a flexible enclosure 590 to form a plurality of pocketed coil-in-coil springs 520. In this regard, each flexible enclosure 590 includes a bottom wall 592, a top wall 596, and a continuous side wall 594 that extends from the bottom wall 592 to the top wall 596 and that surrounds each coil-in-coil spring 10.

Each of the pocketed coil-in-coil springs 520 included in the mattress 500 are arranged in a matrix. The mattress 500 also comprises an upper body supporting layer 503 positioned above the pocketed coil-in-coil springs 520 and a lower foundation layer 504 positioned below the pocketed coil-in-coil springs 520. A sidewall 505 extends between the upper body supporting layer 503 and the lower foundation layer 504 around the entire periphery of the two layers 503, 504, such that the matrix of pocketed coil-in-coil springs 520 is completely surrounded.

Figure 6:
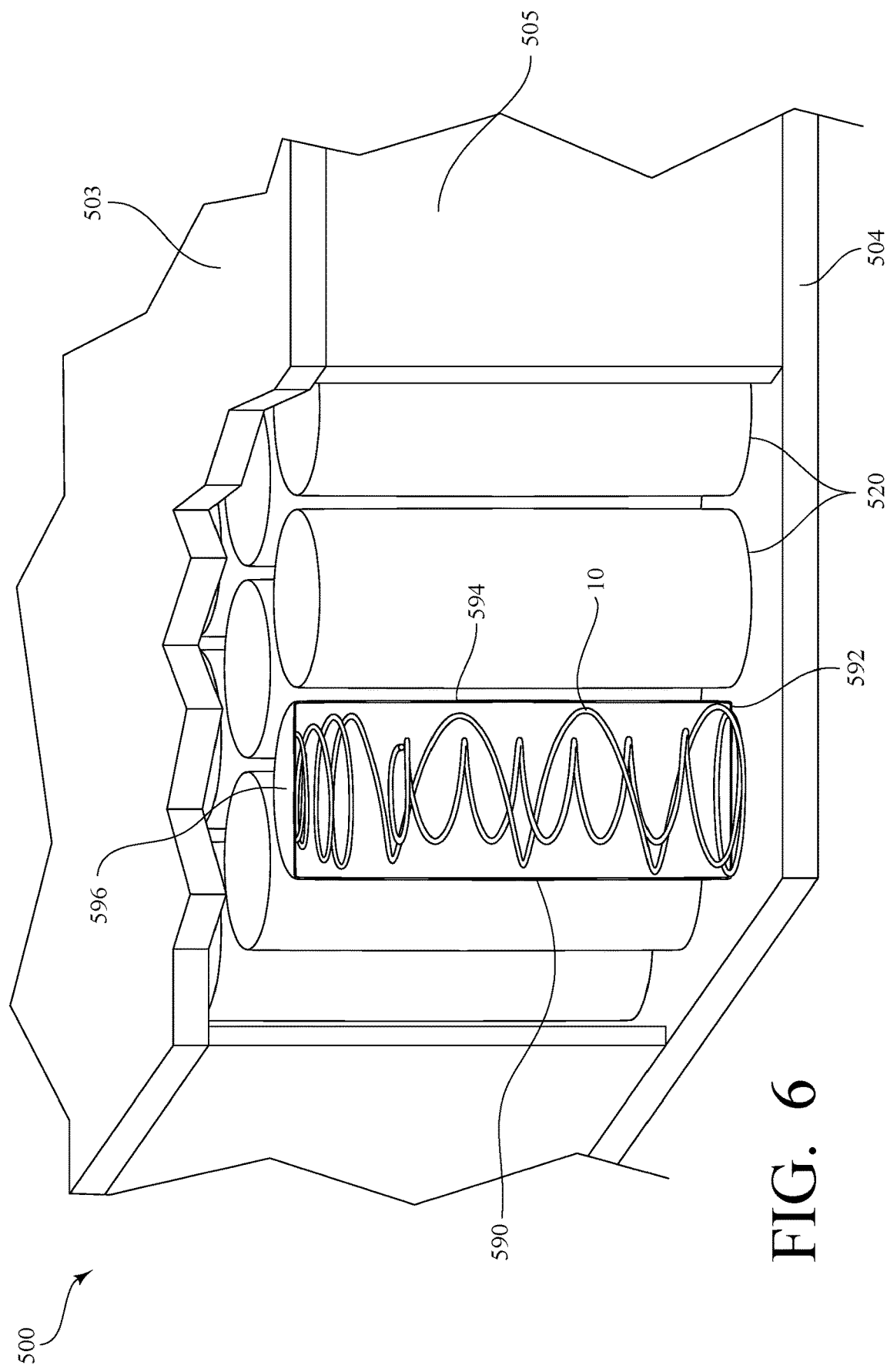
FIG. 6 is a cross-sectional view of an exemplary mattress made in accordance with the present invention, and showing a plurality of the coil-in-coil springs of FIG. 1 arranged in a matrix and enclosed within fabric pockets.

In the mattress 500 shown in FIG. 6, the upper body supporting layer 503 and the sidewall 505 of the mattress 500 are each comprised of a visco-elastic foam to support the body of a user and provide a sufficiently soft surface on which to rest. The lower foundation layer 504, on the other hand, is typically comprised of a piece of wood or other similarly rigid material capable of supporting the matrix of pocketed coil-in-coil springs 520. However, it is of course contemplated that the upper body supporting layer 503 and the sidewall 505 of the mattress 500, as well as the lower foundation layer 504, can also be comprised of other materials or combinations of materials known to those skilled in the art, including, but not limited to foam, upholstery, and/or other flexible materials.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A coil-in-coil spring, comprising:
 a continuous wire including:
 a first spring portion having a first spring constant and forming an outer coil of the coil-in-coil spring;
 a second spring portion having a second spring constant greater than the first spring constant;
 a third spring portion having a third spring constant greater than the first spring constant;
 wherein the third spring portion has a transition convolution and at least two helical intermediate convolutions of differing diameters defining a substantially conical shape and said third spring constant varies;
 wherein the second spring portion is connected to an upper end of said transition convolution and said at least two helical intermediate convolutions of differing diameters are connected to a lower end of said transition convolution;
 wherein both the second spring portion and the third spring portion are positioned within the first spring portion and form an inner coil of the coil-in-coil spring.

2. The coil-in-coil spring of claim 1, wherein the second spring portion is positioned within the first spring portion; and
 wherein the third spring portion is positioned below the second spring portion.

3. The coil-in-coil spring of claim 2, wherein the first spring portion connects to the third spring portion and the first spring portion includes a plurality of helical intermediate convolutions; and
 wherein the third spring portion includes an upper end convolution and the at least two helical intermediate convolutions extending from the upper end convolution of the third spring portion to the transition convolution, each of the at least two helical intermediate convolutions of differing diameters of the third spring portion having a respective diameter, the diameter of each of the plurality of helical intermediate convolutions of the third spring portion progressively increasing as the plurality of helical intermediate convolutions of the third spring portion extends from the upper end convolution of the third spring portion to the transition convolution.

4. The coil-in-coil spring of claim 3, wherein each of the plurality of helical intermediate convolutions of the first spring portion has a respective diameter, the diameter of each of the plurality of helical intermediate convolutions of the first spring portion being substantially the same.

5. The coil-in-coil spring of claim 3, wherein the second spring portion includes an upper end convolution and a plurality of helical intermediate convolutions extending from the lower end of the second spring portion to the upper end convolution of the second spring portion, each of the plurality of helical intermediate convolutions of the second spring portion having a respective diameter, the diameter of each of the plurality of helical intermediate convolutions of the second spring portion being substantially the same.

6. The coil-in-coil spring of claim 5, wherein the continuous wire defines a pitch between each of the plurality of helical intermediate convolutions in the first spring portion, a pitch between each of the plurality of helical intermediate convolutions in the second spring portion, and a pitch between each of the plurality of helical intermediate convolutions in the third spring portion;
 wherein the pitch between each of the plurality of helical intermediate convolutions in the second spring portion is less than the pitch between each of the plurality of helical intermediate convolutions in the first spring portion; and
 wherein the pitch between each of the plurality of helical intermediate convolutions in the third spring portion is less than the pitch between each of the plurality of helical intermediate convolutions in the second spring portion.

7. The coil-in-coil spring of claim 1, wherein the second spring portion includes a plurality of helical intermediate convolutions extending from the transition convolution, each of the plurality of helical intermediate convolutions of the second spring portion having a respective diameter, the diameter of each of the plurality of helical intermediate convolutions of the second spring portion being substantially the same.

8. The coil-in-coil spring of claim 7, wherein the third spring portion includes an upper end convolution and the at least two helical intermediate convolutions, each of the at least two helical intermediate convolutions of the third spring portion having a respective diameter, the diameter of each of the plurality of helical intermediate convolutions of the third spring portion progressively increasing in one direction.

9. The coil-in-coil spring of claim 8, wherein the continuous wire defines a pitch between each of the plurality of helical intermediate convolutions in the second spring portion and a pitch between each of the plurality of helical intermediate convolutions in the third spring portion; and
 wherein the pitch between each of the plurality of helical intermediate convolutions in the third spring portion is less than the pitch between each of the plurality of helical intermediate convolutions in the second spring portion.

10. The coil-in-coil spring of claim 1, wherein the inner coil has an uncompressed height;
 wherein the outer coil has an uncompressed height; and
 wherein the uncompressed height of the inner coil is less than the uncompressed height of the outer coil.

11. The coil-in-coil spring of claim 1, wherein the third spring portion is positioned below the second spring portion.

12. The coil-in-coil spring of claim 11, wherein the second spring portion includes an upper end convolution and a plurality of helical intermediate convolutions extending from the transition convolution of the third spring portion to the upper end convolution of the second spring portion, each of the plurality of helical intermediate convolutions of the second spring portion having a respective diameter, the diameter of each of the plurality of helical intermediate convolutions of the second spring portion being substantially the same.

13. The coil-in-coil spring of claim 12, wherein the continuous wire defines a pitch between each of the plurality of helical intermediate convolutions in the second spring portion and a pitch between each of the plurality of helical intermediate convolutions in the third spring portion; and
  wherein the pitch between each of the plurality of helical intermediate convolutions in the third spring portion is less than the pitch between each of the plurality of helical intermediate convolutions in the second spring portion.

14. The coil-in-coil spring of claim 11, wherein the inner coil has an uncompressed height;
  wherein the outer coil an uncompressed height; and
  wherein the uncompressed height of the inner coil is less than the uncompressed height of the outer coil.

* * * * *